United States Patent [19]

Beebe et al.

[11] 4,400,753
[45] Aug. 23, 1983

[54] UNIVERSAL MAGNETIC RECORDING DISK CARTRIDGE

[75] Inventors: William E. Beebe, Round Rock; Dean R. Duff, Austin, both of Tex.

[73] Assignee: International Business Machines Corporation, Armonk, N.Y.

[21] Appl. No.: 275,543

[22] Filed: Jun. 19, 1981

[51] Int. Cl.³ ............................................. G11B 23/04
[52] U.S. Cl. .................................................. 360/133
[58] Field of Search ........................... 360/133, 97–99; 206/444; 369/180

[56] References Cited

U.S. PATENT DOCUMENTS

| | | | |
|---|---|---|---|
| 3,416,150 | 12/1968 | Lindberg, Jr. | 340/174.1 |
| 3,668,658 | 6/1972 | Flores et al. | 340/174.1 C |
| 3,797,035 | 3/1974 | Hunt et al. | 274/41.4 |
| 4,003,088 | 1/1977 | Schwartz | 360/133 |

OTHER PUBLICATIONS

"1981 Office Product Catalog", Lindsay Office Products, 1610 Manor Road, Austin, Tex. 78722, p. 223, Copyright 1980.

*Primary Examiner*—Alfred H. Eddleman
*Attorney, Agent, or Firm*—John W. Henderson, Jr.

[57] ABSTRACT

An information storage cartridge utilized in a disk drive including a rotary magnetic recording disk and cover for containing the disk. The cover includes a plurality of orientation apertures and transducer apertures which are associated such that orientation sensing means in the disk drive can determine the orientation of the cartridge when it is inserted in the disk drive and thereby whether the information recorded on the disk is recorded on both sides of the disk or only on one side.

3 Claims, 2 Drawing Figures

UNIVERSAL MAGNETIC RECORDING DISK CARTRIDGE

DESCRIPTION

1. Technical Field

This invention relates to magnetic recording apparatus and more particularly to magnetic recording apparatus of the type characterized by a cartridge employing a rotatable magnetic recording disk therein.

2. Background Art

Flexible magnetic recording disks or "diskettes" are in wide use in the computer industry as information storage systems. Typical of the prior art is U.S. Pat. No. 3,668,658 which discloses a circular recording media enclosed in an envelope cover which includes a material for removing contaminants from the surface of the disk. The disk cover is adapted for use in a direct access file. The magnetic record disk within the cover is rotatable for reading and recording information on its surface and is used to store and load programs and data information into a computer system.

Techniques for recording bits of data on the surface of the record disk and the composition of the magnetic material have been steadily improved to pack more and more bits of information into a given length of each record path on the disk. The amount of information that is recorded within a given record length is commonly referred to as "density". Likewise, the application of magnetic material to both sides of the disk has led to a doubling of the disk record capacity. However, the application of recording material to both sides of the disk record media and improvements in the recording density have led to incompatibility between disks recorded on earlier disk drives and those recorded on the newer double sided, higher density disk drives.

DISCLOSURE OF INVENTION

The present invention discloses a magnetic recording disk cartridge and a method for constructing the same whih is adaptable for use in a variety of disk drives which record and playback information on one side or both sides of the disk. The disk cartridge is provided with a plurality of orientation means which cooperate with appropriate sensing means in the disk drive to determine the orientation of the disk cartridge and thereby whether or not information is recorded on both sides of the disk. The orientation means are spaced about the disk cartridge at equal radii from the center of the disk and at varying angles with respect to a grid co-planar with the disk. Apertures in the cartridge envelope provide the disk drive with access to the orientation means for determining the characteristics of the disk and provide access to the disk for the magnetic recording/playback heads.

BEST MODE FOR CARRYING OUT THE INVENTION

Figure 1:
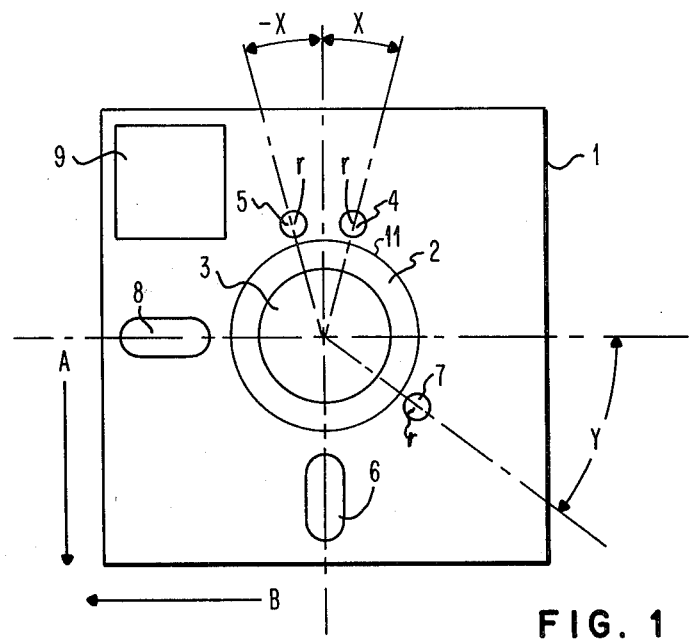
FIG. 1 is a front view of an embodiment of the combination magnetic record disk and the envelope incorporating the features of the invention.

This invention is an improvement of U.S. Pat. No. 3,668,658 issued June 6, 1976 to Ralph Flores, et al. and assigned to the present assignee, which patent is expressly incorporated herein by reference. Referring now to FIG. 1 there is shown a disk cartridge including a cover or envelope 1 which contains a flat circular magnetic recording disk 2. FIG. 1 shows the front side of the disk cartridge which is distinguished by the presence of label 9. The disk 2 has a diameter which is slightly less than the width of the square envelope 1. The envelope 1 contains a circular aperture 11 through which the center portion of the disk 2 is exposed. The portion of the disk 2 exposed in the envelope aperture 11 contains a circular aperture 3 which is smaller in diameter than aperture 11 and into which a drive mechanism fits for rotating the disk within the envelope 1. A suitable drive mechanism is shown in the aforementioned U.S. Pat. No. 3,668,658.

Assuming a rectangular grid co-planar and co-axial with the disk cartridge, a first orientation aperture 4 is located on a radial which forms an angle x with the vertical axis of the grid. The aperture 4 is a fixed distance r from the center of the cartridge. The disk 2 also contains a single aperture (not shown) which is located at an equal distance r from the center of the cartridge such that when the disk is rotated within the envelope the disk aperture becomes aligned and co-axial with the aperture 4 in the envelope 1. A suitable sensing mechanism is located within the disk drive such that when the disk is oriented properly the sensing mechanism is aligned with the aperture 4. Such a sensing mechanism may comprise a light source and light sensor as disclosed in U.S. Pat. No. 3,668,658.

A second circular aperture 5 in the envelope 1 is located on a radial which forms angle $-x$ with the vertical axis of the grid. The magnitudes of angles x and $-x$ are equal. The aperture 5 is located at the same distance r from the center of the cartridge such that aperture 5 also becomes aligned with the aperture in the disk 2 during rotation of the disk 2.

A third circular aperture 7 is located on a radial which forms an angle y with the horizontal axis of the grid. The magnitude of the angle y is not equal to the magnitude of angle x. However, the aperture 7 is located at the same distance r as apertures 4 and 5 such that aperture 7 also becomes aligned with the aperture in disk 2 during rotation.

A first transducer access aperture 6 is located on the vertical axis of the grid and a second transducer aperture 8 is located on the horizontal axis of the grid. The transducer apertures 6 and 8 have generally an oval shape and each is disposed with its longitudinal axis directed radially from the center of the envelope 1 so as to uncover portions of all the information carrying tracks on the disk 2.

Each of the orientation apertures 4, 5 and 7 is associated with one of the transducer apertures 6 and 8 such that when the envelope 1 is properly inserted in a disk drive only one of the orientation apertures will be aligned with an orientation sensing mechanism of the drive and at least one of the transducer apertures will be aligned with the transducer of the disk drive.

Figure 2:
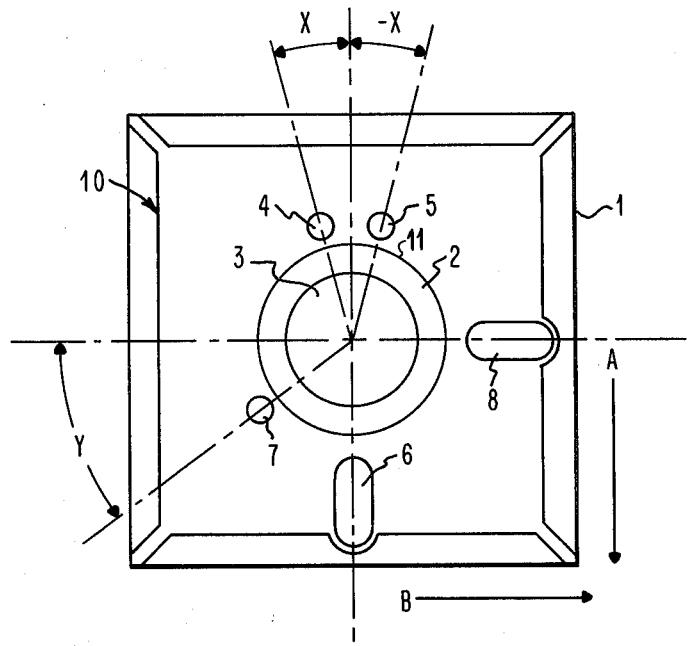
FIG. 2 is a rear view of the disk cartridge of FIG. 1.

FIG. 2 shows the rear side of disk cartridge rotated 180° in the vertical plane. The rear side of the envelope 1 is distinguished by the seam 10 that closes the edges of the cartridge. All of the apertures in the envelope 1 are identical on the rear side and aligned with those on the front side of the envelope 1 to form pairs of apertures in the envelope 1.

The orientation apertures provide for compatible transfer of the disk cartridge among disk drives having different recording side capability. This enables purchasers of the systems using disk drives to be flexible in purchasing a mix of disk drives at different prices and to have data, programs and diagnostics portable among the systems.

The operation and utility of the invention will be described with reference to specific examples. Assume two models of disk drive each including a suitable rotary drive mechanism of the type disclosed in U.S. Pat. No. 3,668,658. The first drive reads and records data at a first density using a single transducer which accesses only one side of the disk. If orientation aperture 4 and transducer access aperture 6 are properly aligned when the disk cartridge is inserted in the drive in the direction of arrow A with the label 9 showing, then orientation aperture 5 and transducer access aperture 6 will be properly aligned when the reverse side of the disk cartridge is showing. In this way the disk cartridge can be flipped over for recording on the second side of the disk 2 on the first disk drive. A second improved disk drive may include the capability to read and/or record at the same density as the first disk drive and further include means for reading and recording at a higher density on both sides of the disk. The disk cartridge recorded on the first disk drive could be inserted in this second drive in the direction of arrow A for reading and/or recording data compatible with the first drive or rotated 90° and inserted in the direction of arrow B for reading and recording on both sides of the disk. When the disk cartridge is inserted in the direction of arrow B a second orientation sensor is necessary to sense the orientation aperture 7 and thus indicate that both sides of the disk are to be read or recorded. It is inherent from the characteristics of the two types of disk drives described that the second disk drive would be more expensive than the first and that the need for the higher priced model would be determined by the work load and business needs of the user. However, the present invention provides a means whereby a system can be conveniently upgraded without requiring an expensive conversion process for moving programs and archived data to the upgraded disk drive. Further the invention permits a user to have a mix of disk drives with the various features and to transfer disk cartridges among the drives.

Additionally, diagnostic programs can be recorded on a single disk cartridge and run on either of the disk drives by proper orientation of the disk cartridge for the disk drive type.

While the invention has been particularly shown and described with reference to a particular embodiment, it will be understood by those skilled in the art that various changes in form and detail may be made without departing from the spirit and scope of the invention.

We claim:

1. In an information storage cartridge utilized in a disk drive including a rotary magnetic recording disk and cover containing said disk, the improvement comprising in combination:

a single orientation aperture in said disk located at a distance from the center of said disk;

a plurality of orientation apertures in said cover defined in a plane lying in substantially coplanar relation to said disk and located an equal distance from the center of said disk for defining the orientation of said disk in said disk drive for reading and recording information on said disk at a first or second recording density; and a plurality of pairs of transducer apertures in said cover for exposing the recording surface of said disk for reading and recording thereon, each pair of said transducer apertures associated with one or more of said orientation apertures for determining that the recording of information on said disk is on one side or both sides of said disk when said cartridge is inserted in said disk drive.

2. The improved information storage cartridge of claim 1 wherein each pair of transducer apertures is associated with a single orientation aperture for reading and recording information on both sides of said disk in a single orentation position on a disk drive having dual transducers.

3. The improved information storage cartridge of claim 1 or claim 2 wherein said pairs of transducer apertures are spaced 90° apart in said cover and wherein said orientation apertures indicate a change in recording density when said cartridge is rotated 90° in said disk drive.

* * * * *